US007828860B2

United States Patent
Kamiyama et al.

(10) Patent No.: US 7,828,860 B2
(45) Date of Patent: Nov. 9, 2010

(54) METHOD OF LAMINATING FUEL CELL-USE SEPARATOR AND FILM/ELECTRODE JUNCTION ELEMENT AND DEVICE THEREFOR

(75) Inventors: Youichi Kamiyama, Sayama (JP); Osamu Kakutani, Sayama (JP); Tetsuo Ishii, Sayama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 1987 days.

(21) Appl. No.: 10/482,456

(22) PCT Filed: Jun. 25, 2002

(86) PCT No.: PCT/JP02/06353

§ 371 (c)(1),
(2), (4) Date: Dec. 30, 2003

(87) PCT Pub. No.: WO03/005467

PCT Pub. Date: Jan. 16, 2003

(65) Prior Publication Data
US 2004/0168306 A1  Sep. 2, 2004

(30) Foreign Application Priority Data
Jul. 6, 2001  (JP) .............................. 2001-206757

(51) Int. Cl.
*H01M 8/00* (2006.01)
(52) U.S. Cl. .................. 29/623.3; 29/623.2; 429/13
(58) Field of Classification Search .............. 429/129, 429/237, 132, 30, 34, 36, 38, 12, 13; 29/623.3, 29/623.2, 730
See application file for complete search history.

(56) References Cited

U.S. PATENT DOCUMENTS

| 4,769,298 A | * | 9/1988 | Hosaka ....................... 429/34 |
| 6,223,449 B1 | * | 5/2001 | Johnson et al. ................ 34/62 |
| 6,372,373 B1 | | 4/2002 | Gyoten et al. |
| 6,524,742 B1 | * | 2/2003 | Emanuel et al. ............. 429/129 |
| 2004/0048152 A1 | * | 3/2004 | Yata et al. ................... 429/162 |

FOREIGN PATENT DOCUMENTS

| JP | 56-078762 | | 6/1981 |
| JP | 58-161268 | | 9/1983 |
| JP | 60-39571 | | 3/1985 |
| JP | 62-055874 | | 3/1987 |
| JP | 4-073950 | | 3/1992 |
| JP | 9-298144 | | 11/1997 |
| JP | 9-316399 | | 12/1997 |
| JP | 09316399 | * | 12/1997 |
| JP | 10277772 | | 10/1998 |
| JP | 11-154522 | | 6/1999 |
| JP | 2000-068694 | | 3/2000 |
| JP | 2002322760 | * | 11/2002 |
| WO | WO99/63610 | * | 12/1999 |

* cited by examiner

*Primary Examiner*—Jennifer Michener
*Assistant Examiner*—Monique Wills
(74) *Attorney, Agent, or Firm*—Rankin, Hill & Clark LLP

(57) ABSTRACT

The present method corrects a warp in a separator (78) applied with a sealant (97) during production of fuel cells. The correction is performed at a correcting device (47). With the warp being corrected at the correcting device, a membrane/electrode assembly is superimposed on the separator.

3 Claims, 15 Drawing Sheets

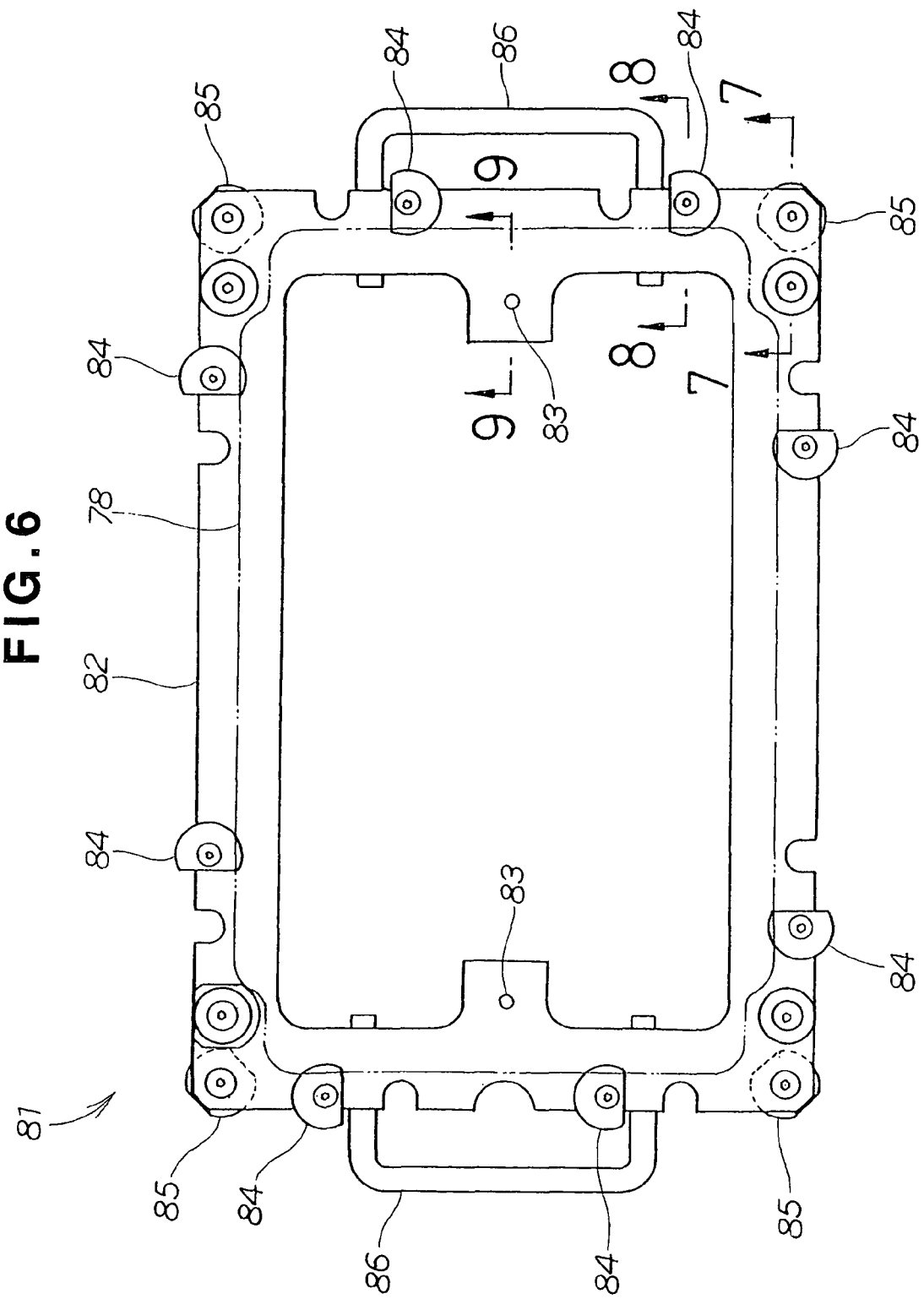

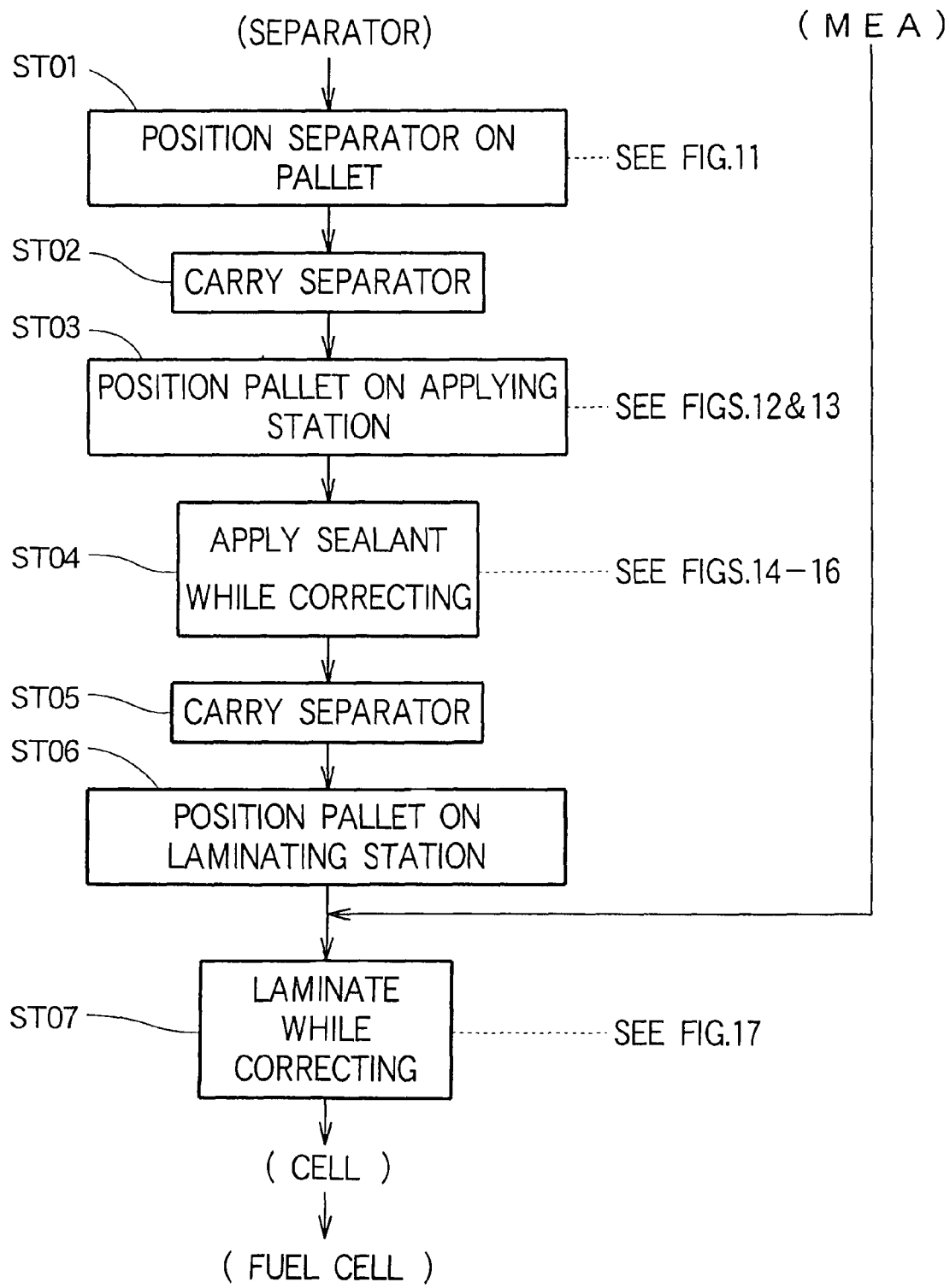

METHOD OF LAMINATING FUEL CELL-USE SEPARATOR AND FILM/ELECTRODE JUNCTION ELEMENT AND DEVICE THEREFOR

TECHNICAL FIELD

The present invention relates to a method of laminating a separator and a membrane/electrode assembly for fuel cells and an apparatus for laminating the same, which are suitable for obtaining good sealing in fuel cells.

BACKGROUND ART

Fuel cells utilize the reverse principle of the electrolysis of water, causing chemical reactions between hydrogen and oxygen, and producing electricity. Only water is theoretically discharged therefrom. Hydrogen is generally expressed as a fuel gas. Air is generally used as an oxygen supply source and expressed as an oxidant gas.

As such a fuel cell, a "Fuel Cell" disclosed in, for example, Japanese Patent Laid-Open Publication No. 2000-123848 is known. This fuel cell is configured to form a cell module by interposing an electrolyte membrane between an anode electrode and a cathode electrode and interposing the anode electrode and the cathode electrode between a first separator and a second separator via gaskets provided at the outer sides of the electrodes, respectively.

More specifically, a first flow path constituting a flow path of a fuel gas is formed on an internal surface of the first separator and a second flow path constituting a flow path of an oxidant gas is formed on an internal surface of the second separator, which supply a fuel gas and an oxidant gas to the middle electrolyte membrane, respectively.

Since an electric power obtained from a single cell module is very small, a plurality of such cell modules are stacked on one another to obtain a desired electric power. The first and second separators are separating members for preventing the leakage of a fuel gas or an oxidant gas into adjacent cells, thus being called as "separators."

The first separator has on its internal surface the first flow path for a fuel gas and the second separator has on its internal surface the second flow path for an oxidant gas. It is required to provide the first and second flow paths with a plurality of very shallow grooves in order to effectively bring the gases into contact with the anode electrode and the cathode electrode.

The first and second separators each have, at one end a fuel gas supply hole and an oxidant gas supply hole for supplying a fuel gas and an oxidant gas to the first and second flow paths, respectively, and have, at the other end, a fuel gas discharge hole and an oxidant gas discharge hole, respectively. The first and second separators also have at the one end cooling water supply holes for letting in cooling water and have at the other end cooling water discharge holes.

The prevent inventors have made various attempts to produce a cell module by applying a liquid sealant instead of two gaskets to separators and interposing a membrane/electrode assembly consisting of an electrolyte membrane and electrodes between two separators, being confronted with a problem as described below.

FIGS. 18A and 18B illustrate a laminating process of two separators and a membrane/electrode assembly.

In FIG. 18A, a separator 203 applied with a sealant 202 is placed on a laminating station 201, a membrane/electrode assembly 206 consisting of an electrolyte membrane 204 and carbon electrodes 205, 205 attached to the opposite surfaces of the electrolyte membrane 204 is superimposed on the separator 203, and another separator 207 applied with a sealant 202 is superimposed on the membrane/electrode assembly 206, forming a lamination of the separator 203, membrane/electrode assembly 206 and separator 207, and thus producing a cell.

In FIG. 18B, the sealants 202, 202 applied to edge portions of the separators 203 and 207 are spread out by lamination. Since the separators 203 and 207 are warped toward each other, the outer thickness of the sealant 202 is t1 and the inner thickness thereof is t2 that is thinner than t1. The thinner the thickness of the carbon electrodes 205, 205, the thin part of the sealant 202 becomes thinner, preventing good sealing.

It is thus desired to improve a method of laminating a separator and a membrane/electrode assembly for fuel cells and an apparatus for laminating the same so as to obtain good sealing in fuel cells.

DISCLOSURE OF THE INVENTION

According to the present invention, there is provided a method of laminating a separator and a membrane/electrode assembly for fuel cells, in which the membrane/electrode assembly is superimposed on the separator applied with a sealant in a laminating station, which method comprises the steps of: correcting a warp in the separator at a correcting device annexed to the laminating station; and superimposing the membrane/electrode assembly on the separator with the correcting device being operated.

A separator formed only on one surface with grooves constituting gas flow paths and the like, or formed on one surface with grooves different in shape from grooves formed on the other surface can be warped. Even if the warp is once corrected, the separator made from resin, for example, is again elastically warped.

In the present invention, since the membrane/electrode assembly is superimposed on the separator while the separator is corrected with the correcting device being operated, the sealant applied to the separator can be spread out to an even thickness, providing good sealing.

The warp in the separator is preferably corrected by attracting and flattening the separator under a negative pressure formed by jetting of a compressed air at the correcting device. The correcting device configured to discharge the compressed air in jets prevents the attracted separator from contacting the correcting device, and will not damage the separator.

In the present invention, the negative pressure formed at the correcting device is preferably controlled so as to reduce the height of the separator between a sealant-applied surface applied with the sealant and a corrected surface to be corrected in warping, to or below a predetermined value. Thus reducing the height between the sealant-applied surface and the corrected surface to or below a predetermined value by controlling the negative pressure at the correcting device allows easy setting of the height only by adjusting the amount of jets of the compressed air, varying the negative pressure. Preparation in the lamination process thus becomes easy, improving workability.

According to the present invention, there is further provided an apparatus for laminating a separator and a membrane/electrode assembly for use as a fuel cell, which apparatus comprises: a pallet on which the separator applied with a sealant is placed; and a correcting device for correcting a warp in the separator; wherein, the membrane/electrode assembly is superimposed on the separator with the correcting device being operated. As described above, the correcting device emits the compressed air in jets. The laminating apparatus of such a simple structure is obtained.

BRIEF DESCRIPTION OF THE DRAWINGS

FIG. 6 is a plan view of a pallet for carrying the separator;

FIG. 10 is a flow diagram of the application of a sealant to the separator and lamination;

BEST MODE FOR CARRYING OUT THE INVENTION

Figure 1:
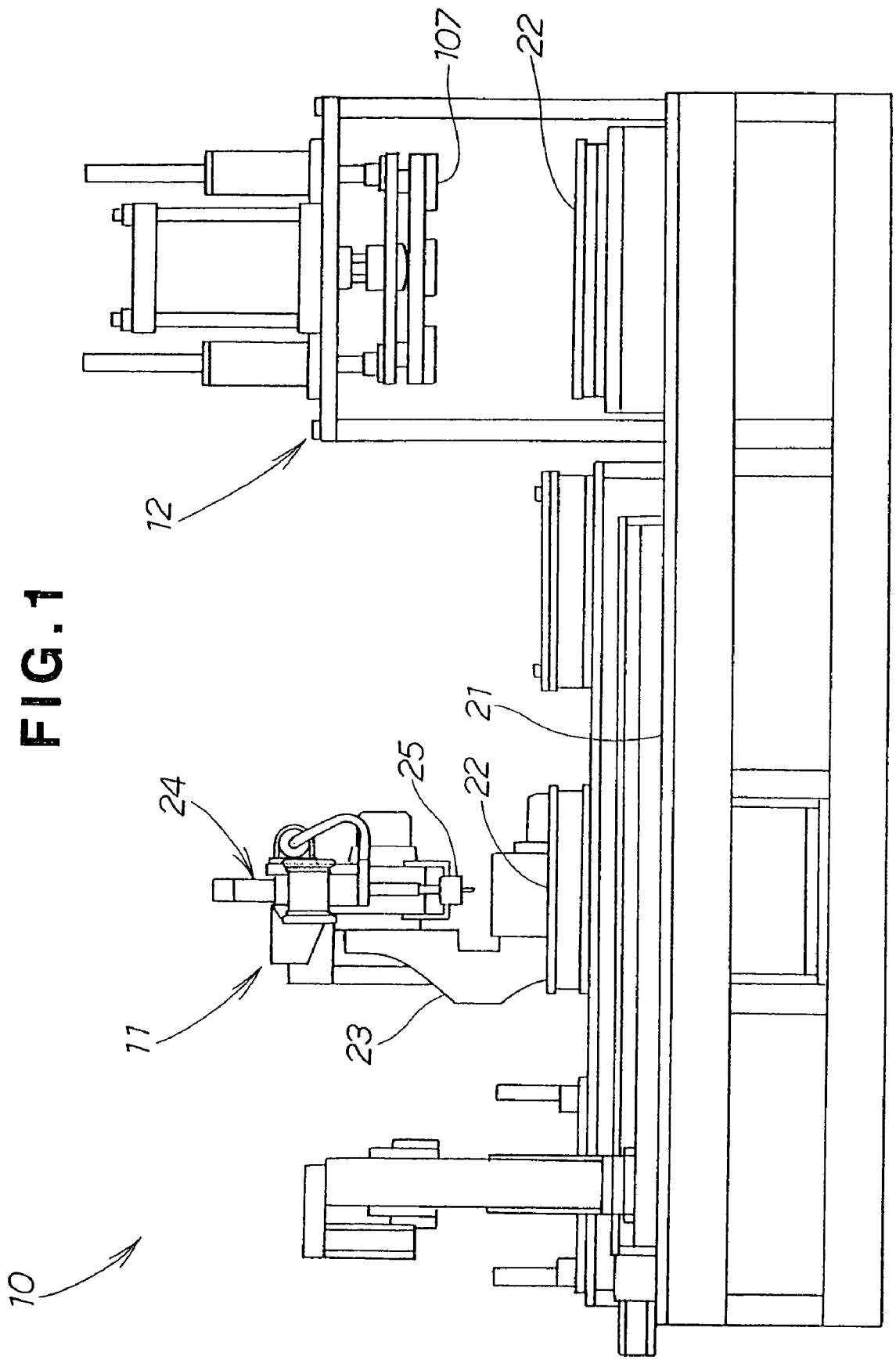
FIG. 1 is a front view of a sealant-application and lamination apparatus for fuel cell separators according to the present invention.

As shown in FIG. 1, a sealant-application and lamination apparatus 10 for fuel cell separators has a sealant applying station 11 for applying a sealant to a separator and a laminating station 12 for superimposing a membrane/electrode assembly on a separator applied with a sealant.

A membrane/electrode assembly (hereinafter referred to as an "MEA") is configured by attaching an anode electrode and a cathode electrode of carbon papers to the opposite surfaces of a high polymer electrolyte membrane of a high molecular compound.

Figure 2:
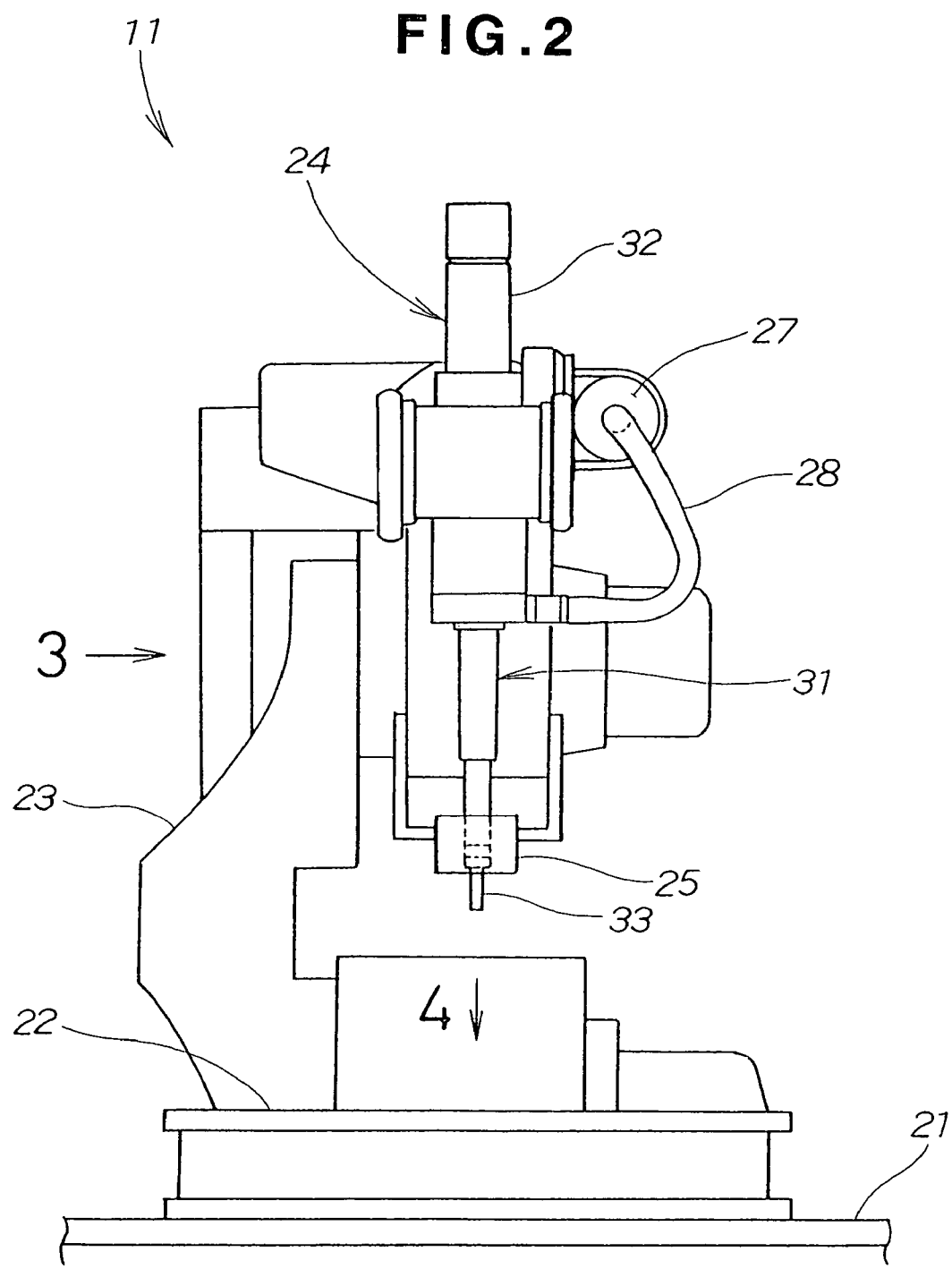
FIG. 2 illustrates a sealant applying station shown in FIG. 1.
Figure 3:
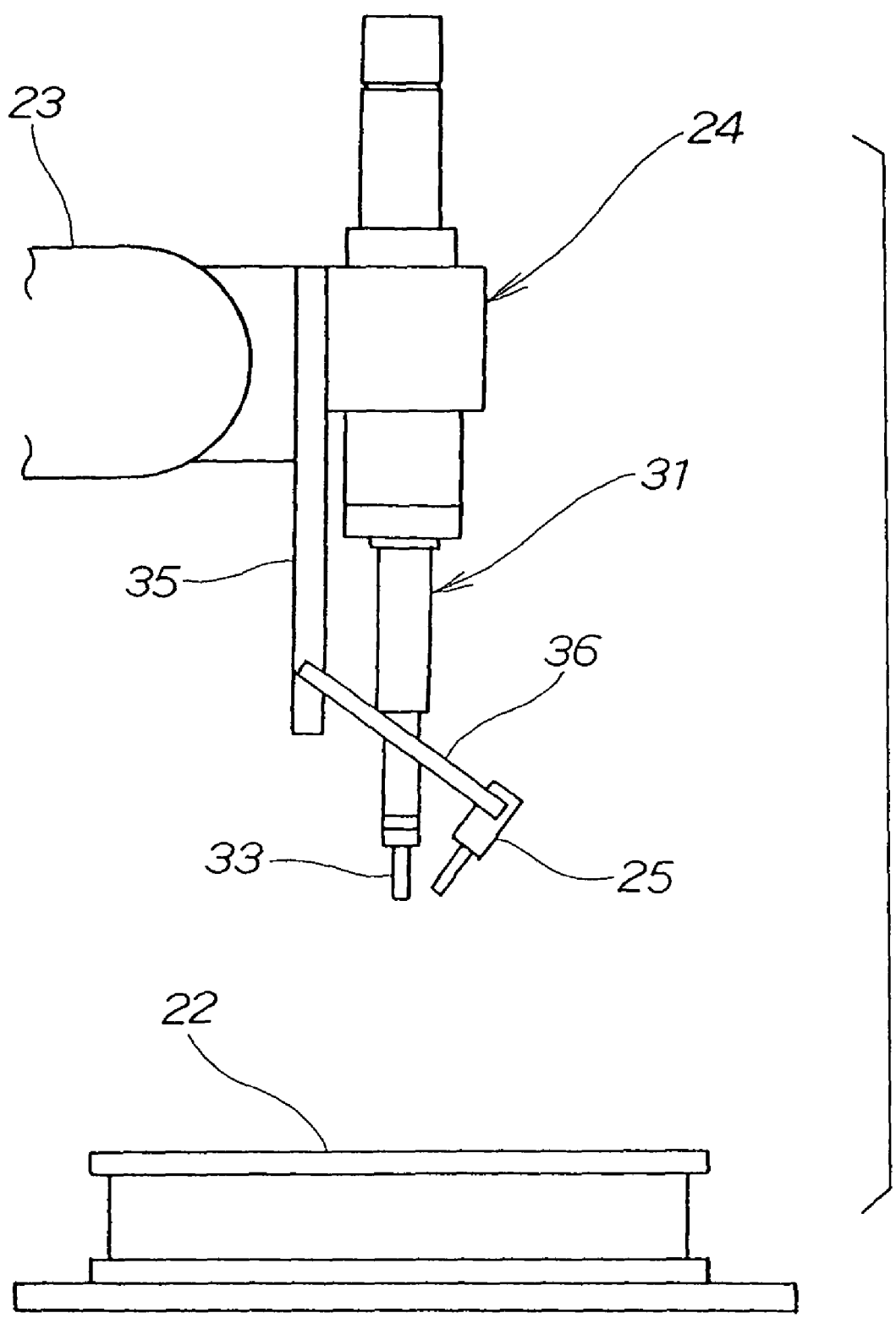
FIG. 3 is a side view of the sealant applying station as seen along arrow 3 in FIG. 2.
Figure 4:
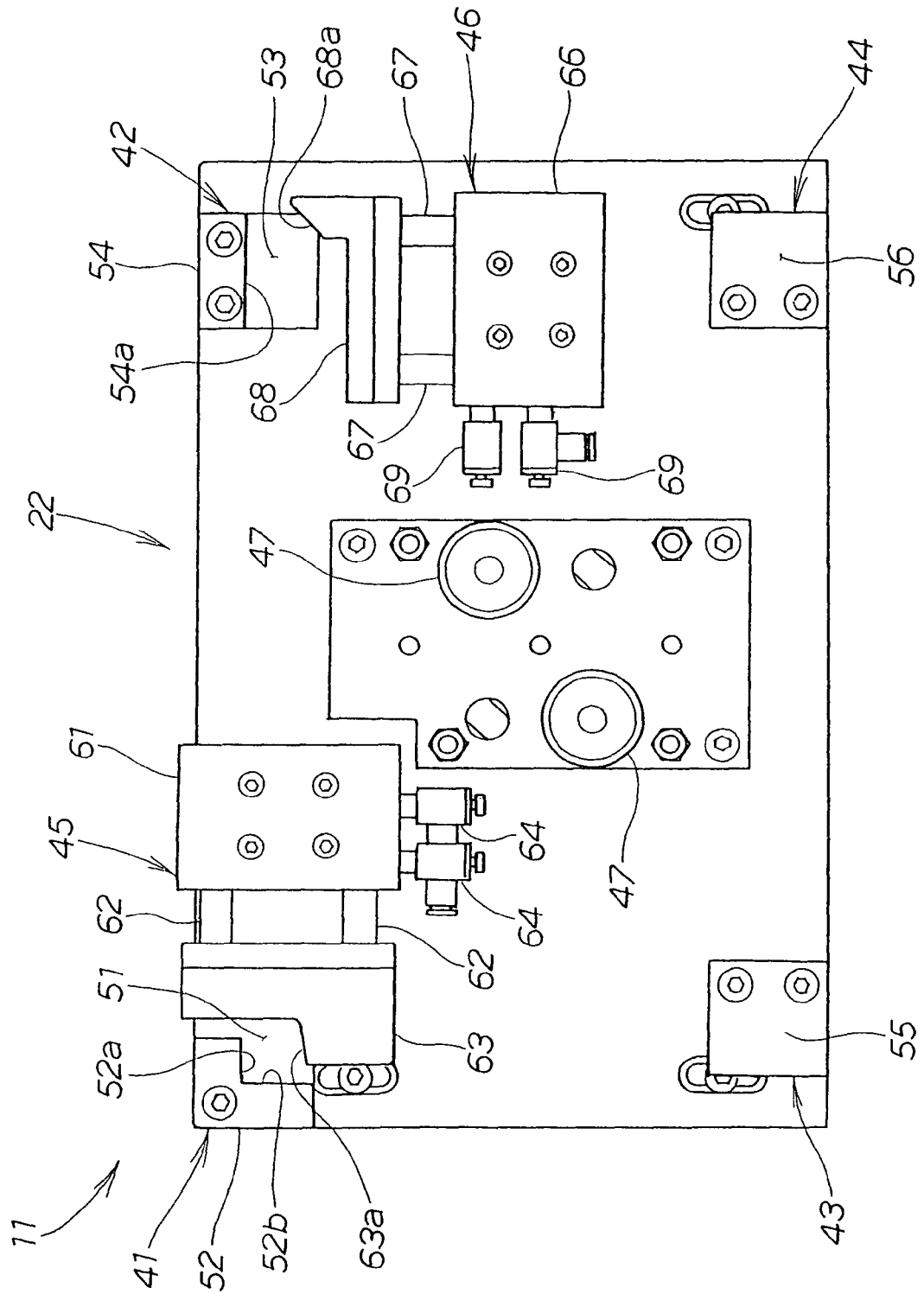
FIG. 4 is a top view of a separator mount, as seen along arrow 4 in FIG. 2.

FIGS. 2 to 4 illustrate the sealant applying station 11 shown in FIG. 1. The sealant applying station 11 includes a separator mount 22 mounted on a base 21, an arm 23 mounted on the base 21, a sealant applying gun 24 mounted to the arm 23, and a non-contact sensor 25 disposed in the vicinity of the distal end of the sealant applying gun 24.

The sealant applying gun 24 includes a replaceable sealant cartridge 27 storing a sealant, a sealant supply hose 28 attached to the sealant cartridge 27, a sealant extruder 31 connected to the distal end of the sealant supply hose 28, an electric motor 32 for driving the sealant extruder 31, and a nozzle 33 attached to the distal end of the sealant extruder 31 for discharging the sealant.

The non-contact sensor 25 irradiates a separator surface approximately below the nozzle 33 with, for example, a laser, detecting an already-applied sealant without contacting it during the application of the sealant to the separator. A controller not shown controls the horizontal and vertical movement of the sealant applying gun 24 by actuating the arm 23 based on a signal from the non-contact sensor 25.

The sealant extruder 31 of the sealant applying gun 24 has a screw with a spiral groove inserted into a cylinder. The screw is rotated with the electric motor 32 to suck a sealant within the sealant cartridge 27 via the sealant supply hose 28 and extrude the sealant from between the inner wall of the cylinder and the screw groove to be discharged from the nozzle 33.

As shown in FIG. 3, a back board 35 is attached to the rear of the sealant applying gun 24. A pair of stays 36 (the stay 36 behind is not shown) are extended obliquely downward from a lower end of the back board 35. The non-contact sensor 25 is attached to the distal ends of the stays 36. The distal end of the non-contact sensor 25 is oriented downward of the nozzle 33.

FIG. 4 illustrates the sealant applying station viewed from the top.

The separator mount 22 of the sealing application station 11 has pallet mounting portions 41, 42, 43 and 44 on which a pallet 81 (see FIG. 6) for carrying a separator is placed, a first locating member 45 and a second locating member 46 for positioning the pallet 81 on the separator mount 22, and correcting devices 47, 47 as correcting means for correcting a warp in a separator mounted on the pallet 81.

The pallet mounting portion 41 has a mounting surface 51 and an L-shaped protrusion 52 protruded from the mounting surface 51. The L-shaped protrusion 52 has locating surfaces 52a and 52b.

The pallet mounting portion 42 has a mounting surface 53 and a rectangular protrusion 54 protruded from the mounting surface 53. The rectangular protrusion 54 has a locating surface 54a.

The pallet mounting portions 43 and 44 have mounting surfaces 55 and 56, respectively.

The first locating member 45 includes a cylinder portion 61, rods 62, 62 inserted into cylinders not shown within the cylinder portion 61, and a presser 63 attached to the distal ends of the rods 62, 62. The first locating member 45 supplies oil or air from inlets 64, 64 into the cylinders to push out the rods 62, 62, pressing a part of the pallet 81 with the presser 63, and positioning the pallet 81. Reference numeral 63a denotes an oblique surface formed on the presser 63.

The second locating member 46 includes a cylinder portion 66, rods 67, 67 inserted into cylinders not shown within the cylinder portion 66, and a presser 68 attached to the distal ends of the rods 67, 67. The second locating member 46 supplies oil or air from inlets 69, 69 into the cylinders to push out the rods 67, 67, pressing a part of the pallet 81 with the presser 68, and positioning the pallet 81. Reference numeral 68a denotes an oblique surface formed on the presser 68.

Figure 5A:
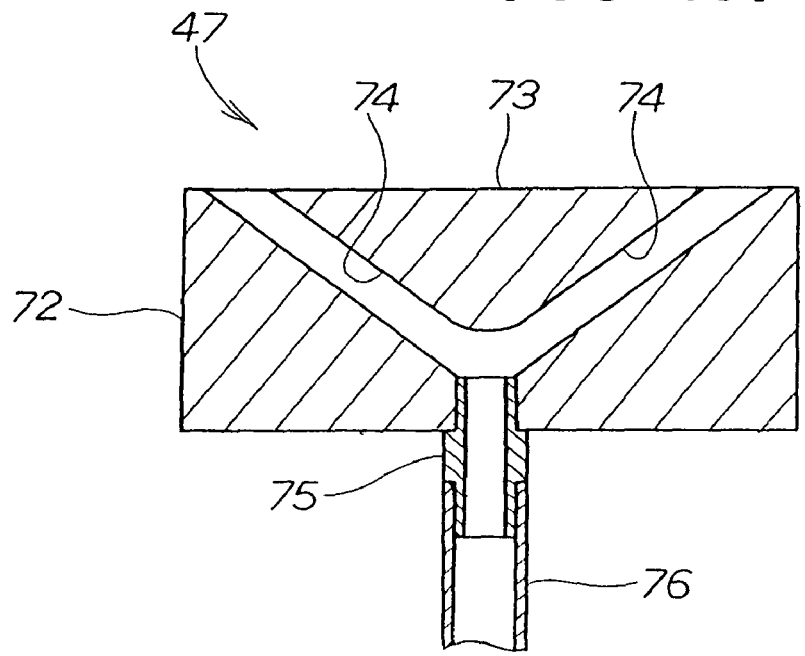
FIGS. 5A and 5B illustrate a correcting device for correcting a warp in a separator.
Figure 5B:
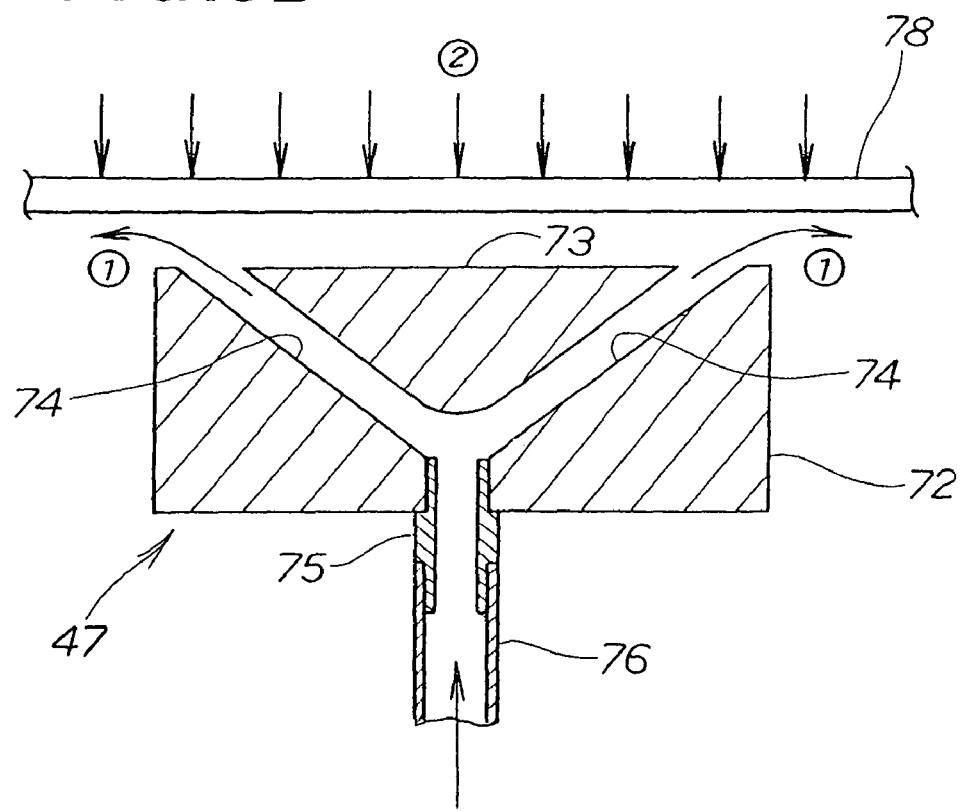

FIGS. 5A and 5B illustrate the correcting device 47 for fuel cell separators shown in FIG. 4.

In FIG. 5A, the correcting device 47 includes a cylindrical portion 72, a joint pipe 75 connected to a plurality of jet orifices 74 formed in the cylindrical portion 72, opening along the edge of an upper surface 73, and an air hose 76 connected to the joint pipe 75.

In FIG. 5B, a compressed air is supplied through the air hose 76, and the air jets out through the joint pipe 75 and the plurality of jet orifices 74. When a separator 78 is brought close to the correcting device 47, the air swiftly flows out from between the edge of the cylindrical portion 72 and the separator 78 as shown by arrows ①, ①. This causes a negative pressure between a central portion of the upper surface 73 of the cylindrical portion 72 and the separator 78, drawing the separator 78 toward the cylindrical portion 72 as shown by arrows ②. The jets of air from the jet orifices 74 prevent the separator 78 from contacting the upper surface 73 of the cylindrical portion 72.

Specifically, the correcting device 47 can attract the separator 78 at a distance without contacting the separator 78, correcting a warp in the separator 78.

Further, since the correcting device 47 does not contact the separator 78, no metal ions are attached to the separator 78. If metal ions are attached to the separator 78, they would be attached to carbon electrodes of an MEA superimposed on the separator 78, combining with electrons, and depositing a metal on the carbon electrodes. The deposited metal can prevent a reaction between hydrogen and oxygen, degrading the performance of the fuel cell.

FIG. 6 illustrates a pallet viewed from the top for carrying the fuel cell separator 78 according to the present invention. The pallet 81 as a carrying member includes a frame 82. The frame 82 has locating pins 83, 83 for positioning the separator 78, a plurality of hooks 84 for fixing the separator 78, and a plurality of locating blocks 85 for location on the separator mount 22 shown in FIG. 4. The frame 82 has handles 86, 86 at its opposite ends.

Figure 7:
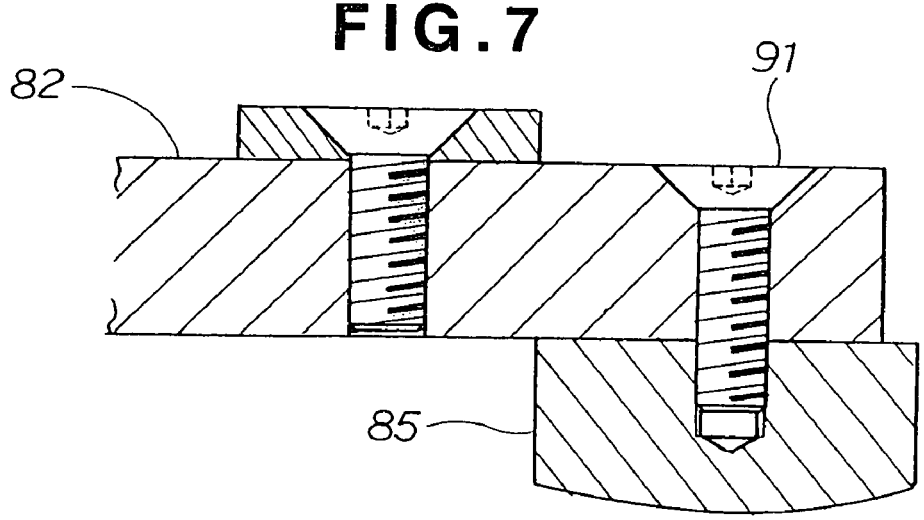
FIG. 7 is an enlarged cross-sectional view taken along line 7-7 in FIG. 6.

FIG. 7 illustrates the locating block 85 fixed to the undersurface of the frame 82 with a screw 91. The locating block 85 is, as also shown in FIG. 6, a cylindrical member.

Figure 8:
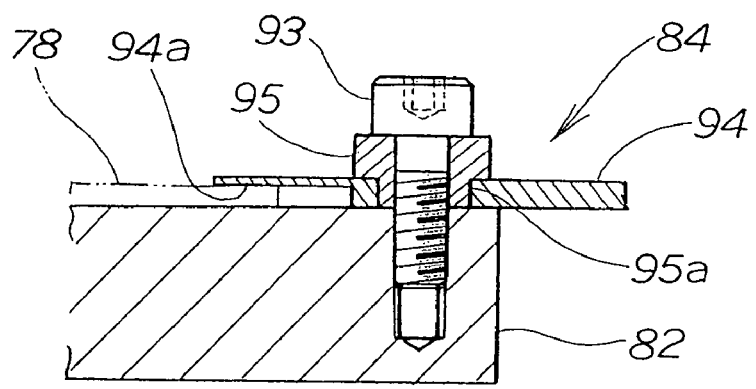
FIG. 8 is an enlarged cross-sectional view taken along line 8-8 in FIG. 6.

As shown in FIG. 8, the hook 84 includes a separator fastening piece 94 and a collar 95. The separator fastening piece 94 is attached to the upper surface of the frame 82 via the collar 95 with a bolt 93.

The height of a step 95a of the collar 95 is set greater than the thickness of the separator fastening piece 94. The separator fastening piece 94 is thus rotatable about the collar 95 fixed to the frame 82 by fastening the bolt 93. Reference numeral 94a denotes a notch formed on the undersurface of the separator fastening piece 94, to be engaged on an edge portion of the separator 78.

Figure 9:
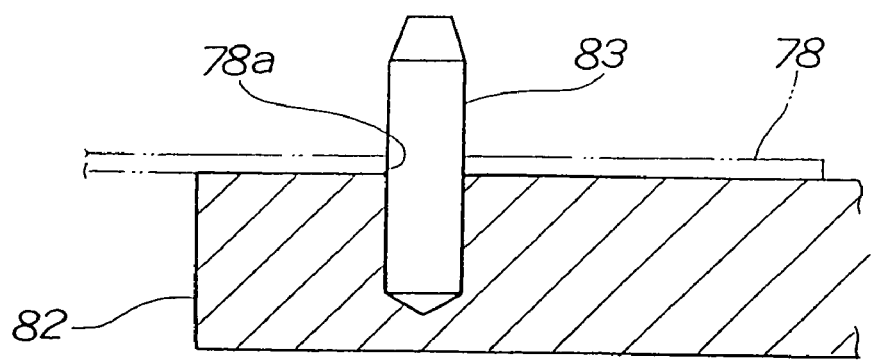
FIG. 9 is an enlarged cross-sectional view taken along line 9-9 in FIG. 6.

FIG. 9 illustrates the locating pin 83 driven into the upper surface of the frame 82, and the locating hole 78a of the separator 78 fitted onto the locating pin 83.

FIG. 10 is a flow diagram of a sealant application to a separator for fuel cells and lamination according to the present invention.

Step (hereinafter abbreviated as ST) 01: A separator is positioned on a pallet.

ST02: The pallet carries the separator.

ST03: The pallet is positioned in the sealant applying station. That is, the separator is positioned in the sealant applying station.

ST04: With a warp in the separator corrected, a sealant is applied to the separator.

ST05: The pallet carries the separator.

ST06: The pallet is positioned in the laminating station.

ST07: With a warp in the separator corrected, an MEA is superimposed on the separator. A plurality of cells are produced in this manner and stacked on one another to produce a fuel cell.

Figure 11A:
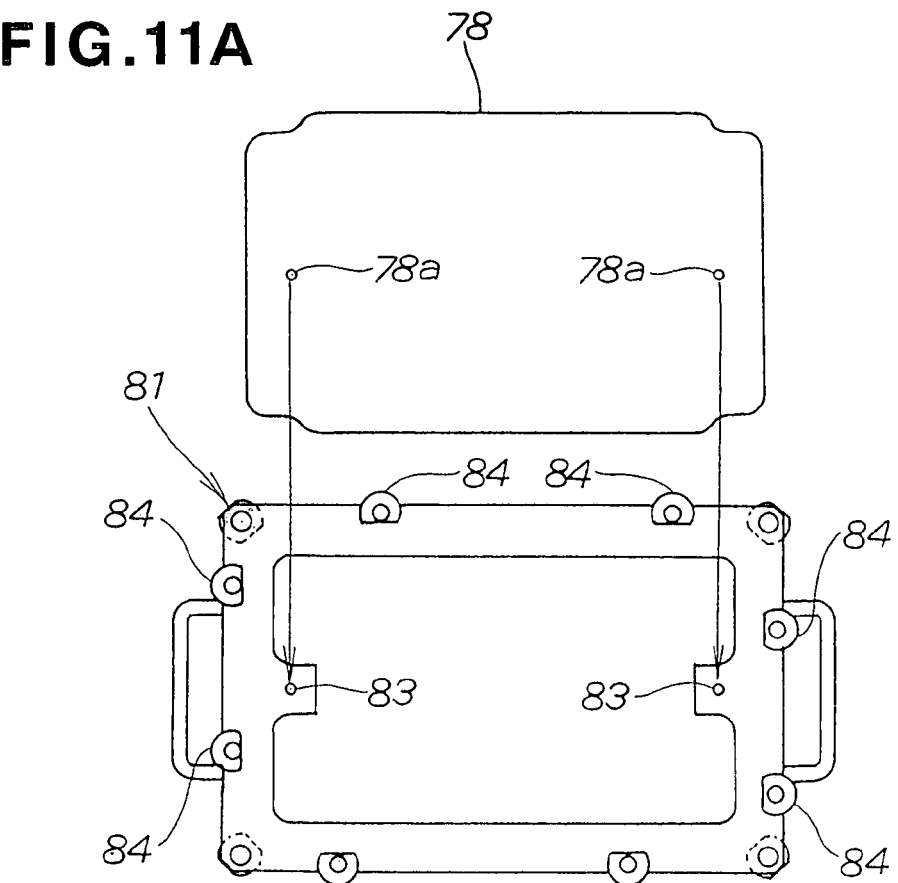
FIGS. 11A to 11C are explanatory views of positioning the separator on the pallet.
Figure 11B:
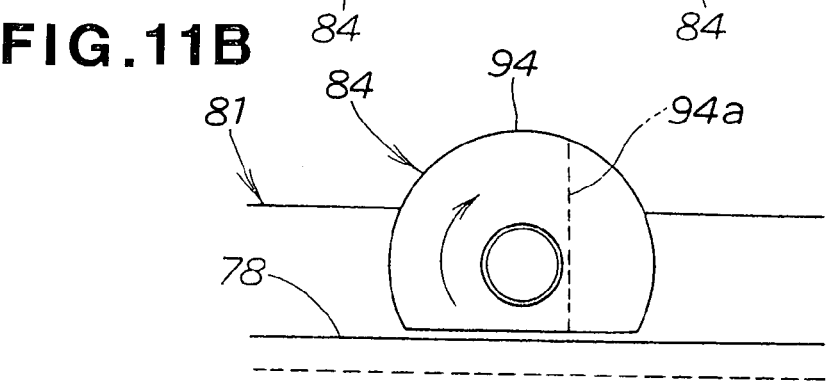
Figure 11C:
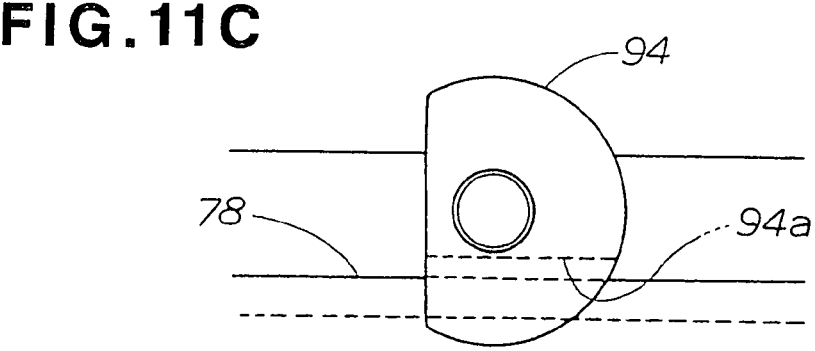

FIGS. 11A to 11C illustrate the separator 78 positioned on the pallet 81.

As shown in FIG. 11A, the locating holes 78a, 78a of the separator 78 are first fitted onto the locating pins 83, 83 of the pallet 81 to position the separator 78 on the pallet 81.

As shown in FIG. 11B, the separator fastening piece 94 of the hook 84 provided on the pallet 81 is rotated as shown by an arrow, engaging the notch 94a of the separator fastening piece 94 on an edge portion of the separator 78 as shown in FIG. 11, and fastening the edge portion of the separator 78.

Figure 12:
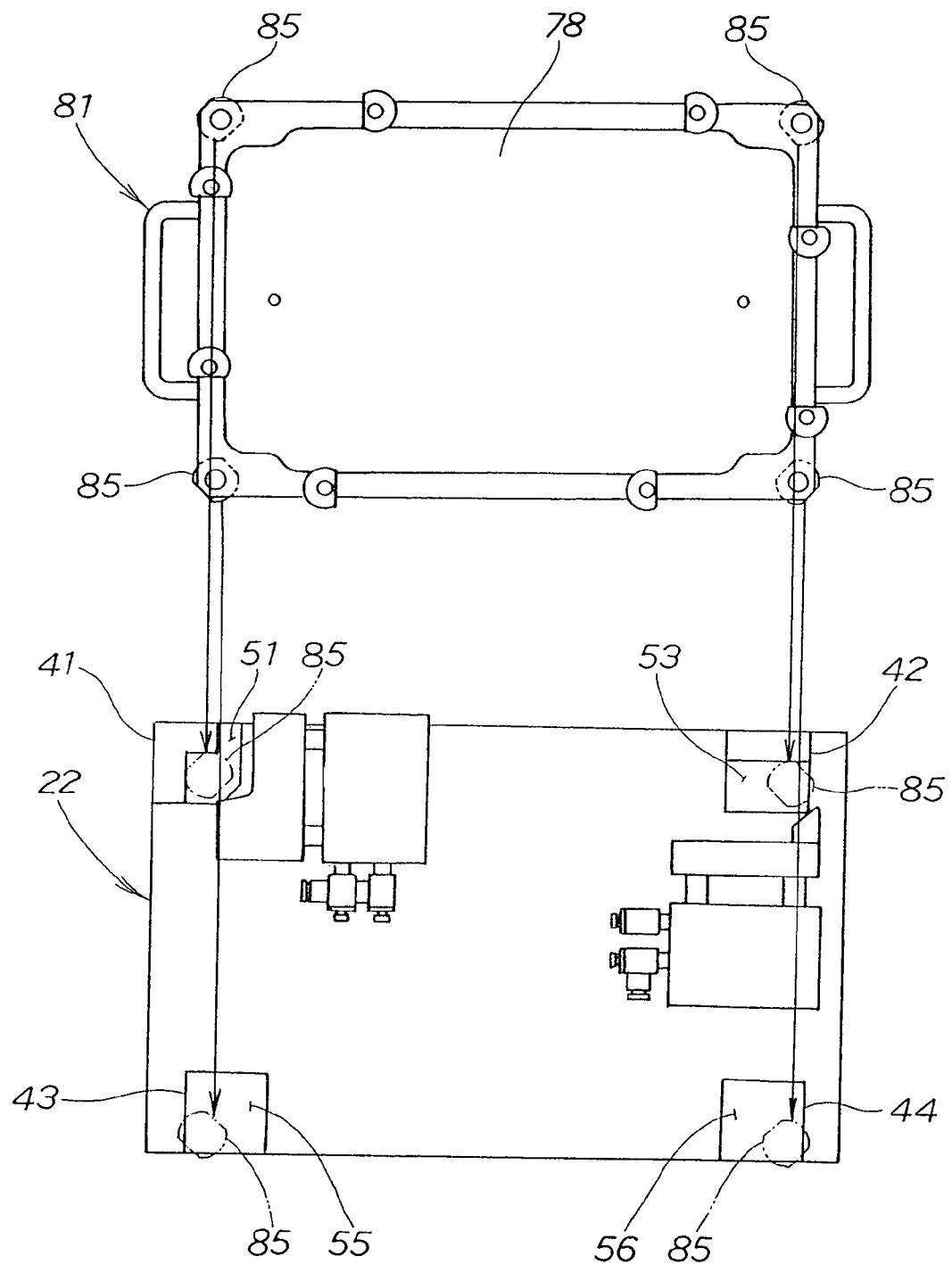
FIG. 12 is an explanatory view of placing a pallet mount onto the separator mount.

As shown in FIG. 12, the locating blocks 85 provided at four corners of the pallet 81 are placed on the pallet mounting portions 41, 42, 43 and 44 of the separator mount 22.

FIGS. 13A to 13D illustrate the positioning of a pallet at the pallet mounting portion 41.

Figure 13A:
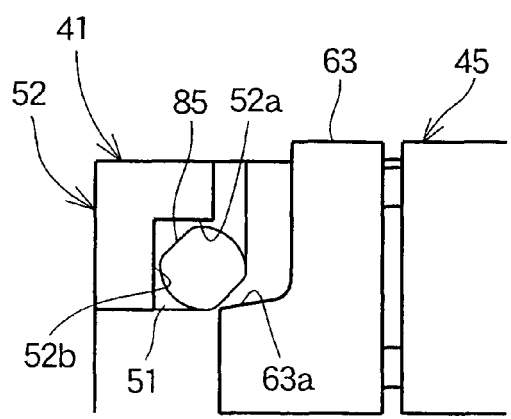
FIGS. 13A to 13D are partial diagrams illustrating the sequence of positioning the pallet on pallet mounting portions.

As shown in FIG. 13A, the locating block 85 is placed on the mounting surface 51 at a distance from the locating surfaces 52a and 52b of the L-shaped protrusion 52 of the pallet mounting portion 41.

Figure 13B:
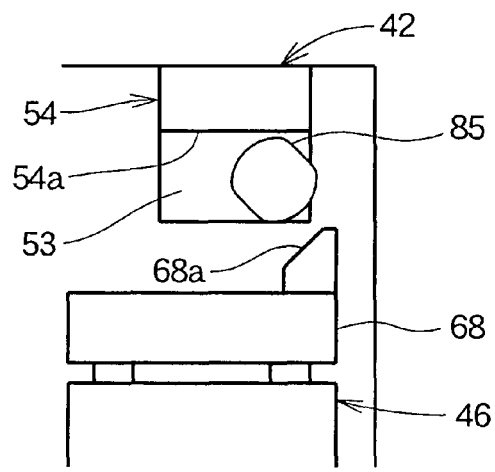

As shown in FIG. 13B, the locating block 85 is placed on the mounting surface 53 at a distance from the locating surface 54a of the rectangular protrusion 54 of the pallet mounting portion 42.

Figure 13C:
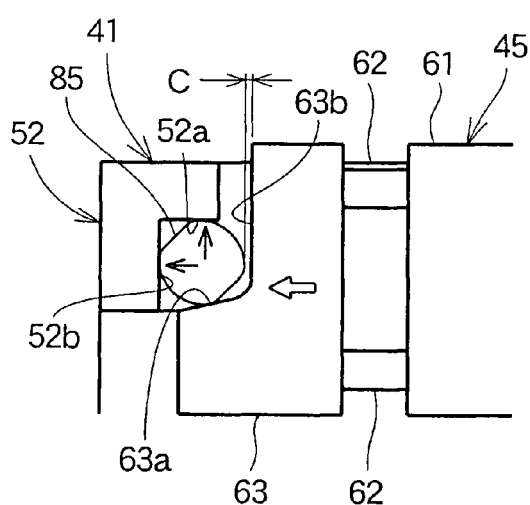

As shown in FIG. 13C, the presser 63 is advanced toward the L-shaped protrusion 52 as shown by an arrow via the rods 62, 62 by supplying oil or air to the cylinder portion 61, to bring the oblique surface 63a of the presser 63 into contact with the locating block 85. The locating block 85 receives component forces in leftward and upward directions in the figure applied from the oblique surface 63a, moving leftward and upward as shown by arrows.

Figure 13D:
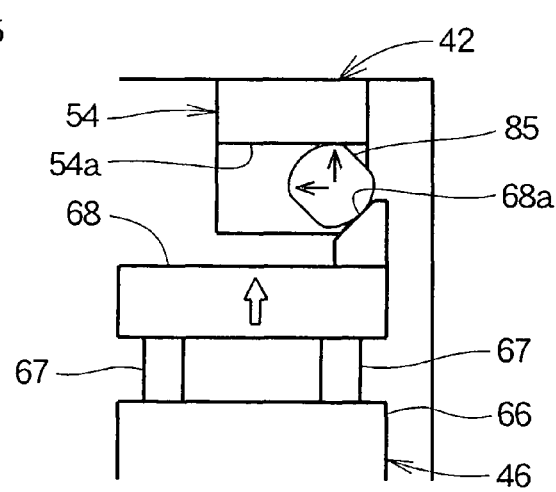

As shown in FIG. 13D, the presser 68 is advanced toward the rectangular protrusion 54 as shown by an arrow via the rods 67, 67 by supplying oil or air to the cylinder portion 66, to bring the oblique surface 68a of the presser 68 shown in FIG. 13B into contact with the block 85 nearly simultaneously with the contact of the oblique surface 63a shown in FIG. 13A to the locating block 85. The locating block 85 receives component forces in leftward and upward directions in the figure applied from the oblique surface 68a, moving leftward and upward as shown by arrows.

In FIGS. 13C and 13D, with the pressers 63 and 68 continuously moved, the oblique surfaces 63a, 68a make the locating block 85 shown in FIG. 13A abut on the locating surfaces 52a and 52b and the locating block 85 shown in FIG. 13B abut on the locating surface 54a. At that time, an amount of clearance C occurs between a side surface 63b of the presser 63 and the locating block 85 as shown in FIG. 13C, with the locating block 85 being supported at three places on the locating surfaces 52a and 52b and the oblique surface 63a.

The locating blocks 85, 85 placed on the mounting surface 55 of the pallet mounting portion 43 and the mounting surface 56 of the pallet mounting portion 44 shown in FIG. 12 move with the movement of the locating blocks 85, 85 placed on the above-described mounting surfaces 51 and 53. In this manner, the positioning of the pallet 81 on the separator mount 22 is completed.

Figure 14A:
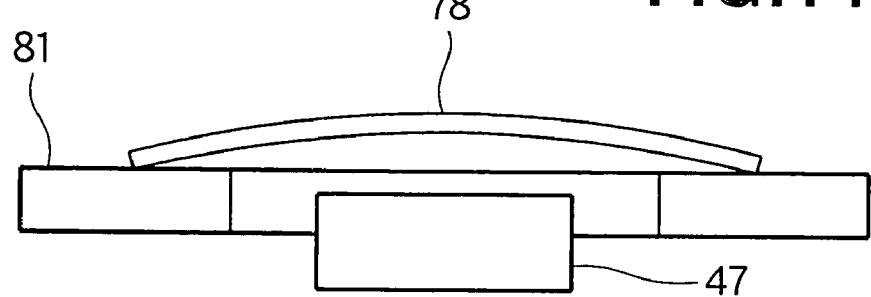
FIGS. 14A and 14B are schematic diagrams illustrating the correction of a warp in the separator with the correcting device.
Figure 14B:
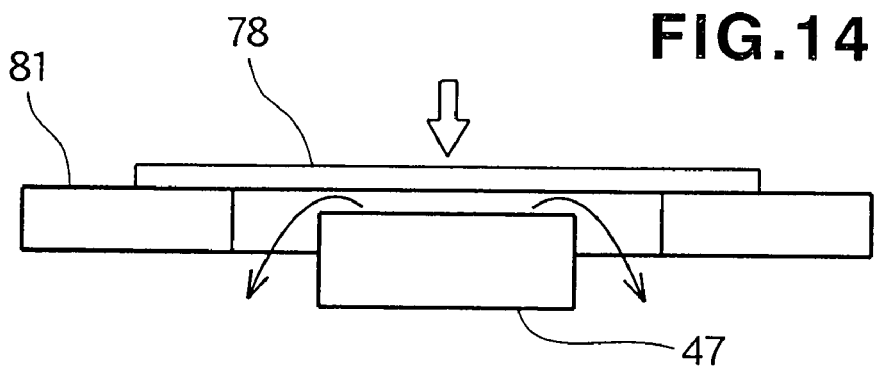

FIGS. 14A and 14B illustrate the correction of a warp in the separator 78 with the correcting device 47.

FIG. 14A illustrates that the correcting device 47 is disposed below the separator 78 placed on the pallet 81. One of the two correcting devices 47 is omitted for convenience. A separator 78 formed only on one surface with grooves constituting gas flow paths and the like, or a separator 78 formed on one surface with grooves different in shape from grooves formed on the other surface suffers warping as shown in the figure.

As shown in FIG. 14B, to correct the warp in the separator 78, a compressed air is supplied to the correcting device 47 to jet out from between the correcting device 47 and the separator 78 as shown by arrows, attracting the separator 78 with the correcting device 47. As a result, the separator 78 becomes flat as shown by a hollow arrow.

Figure 15:
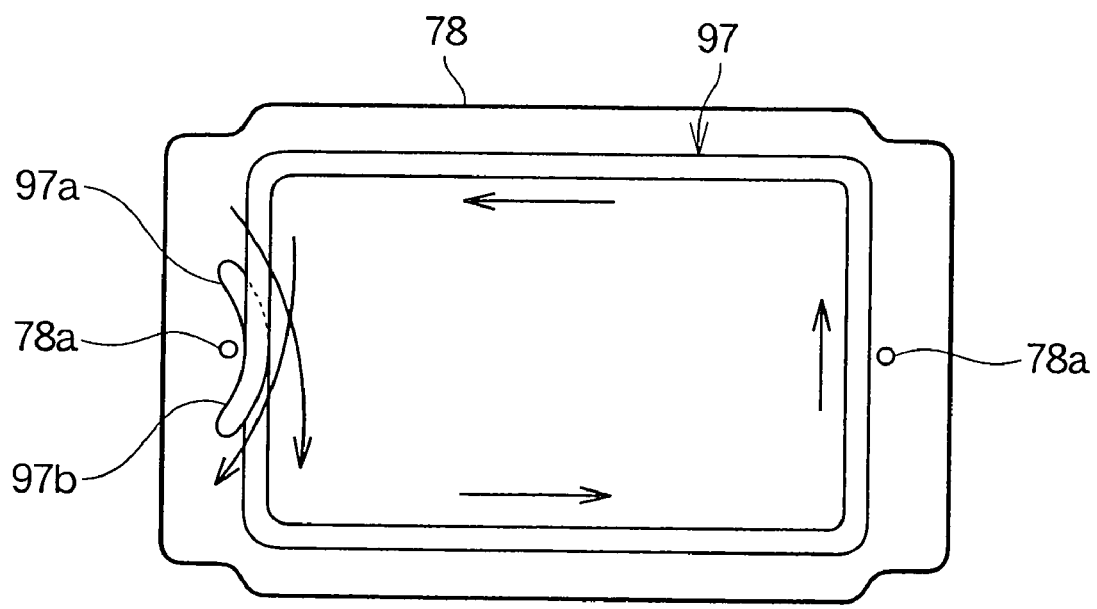
FIG. 15 is a diagram illustrating the application of a sealant to the separator with the separator being corrected.

FIG. 15 illustrates the application of a sealant 97 to the separator 78 with the separator 78 being corrected.

With the warp in the separator 78 corrected, that is, with the correcting devices 47 (see FIG. 14B) operated, the sealant 97 is applied to the separator 78. The sealant 97 is initially applied in the vicinity of the locating hole 78a (97a denotes an application-start portion), for example, and is applied in a rectangular shape to the inside generally along the edge of the separator 78 as shown by arrows. An application-end portion 97b is crossed over the application-start portion 97a.

FIGS. 16A to 16H illustrate the process of applying a sealant in the vicinity of an intersecting position between the application-start portion 97a and the application-end portion 97b during the application of the sealant 97 to the separator 78.

Figure 16A:
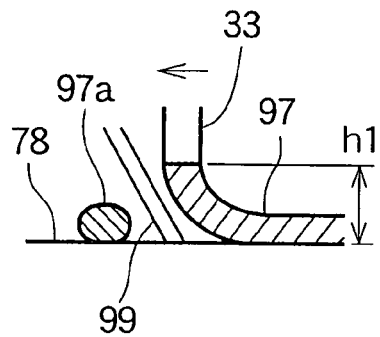
FIGS. 16A to 16H are diagrams illustrating the process of applying a sealant between an application-start portion and an application-end portion during the application of the sealant to the separator.

In FIG. 16A, the nozzle 33 of the sealant applying gun moves while applying the sealant 97 to the separator 78, maintaining a height h1 from the separator 78.

Figure 16B:
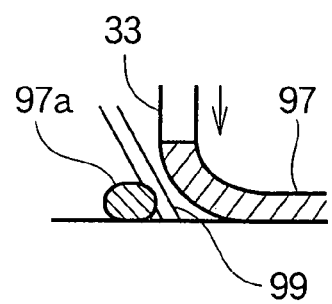
Figure 16C:
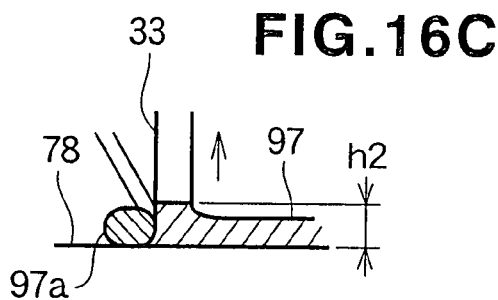

In FIG. 16B, the nozzle 33 comes close to the application-start portion 97a of the sealant 97. When a laser 99 emitted from the non-contact sensor 25 shown in FIG. 3 detects the application-start portion 97a of the sealant 97, the nozzle 33 starts moving downward as shown by an arrow. The nozzle 33 moves downward to the position of a height h2 from the separator 78 as shown in FIG. 16C, and then the nozzle 33 starts moving upward as shown by an arrow.

Figure 16D:
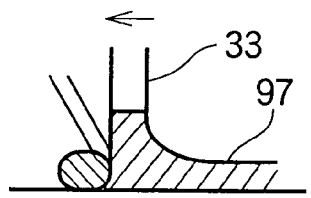

In FIG. 16D, upon reaching the original height h1 from the separator 78 (see FIG. 16A), the nozzle 33 again moves horizontally as shown by an arrow, maintaining the height h1.

Figure 16E:
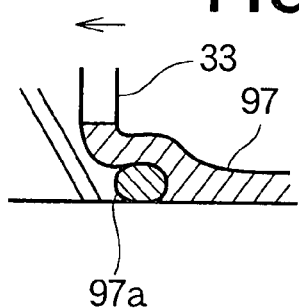
Figure 16F:
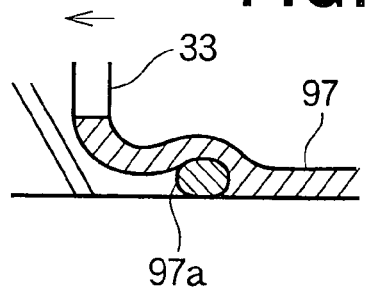
Figure 16G:
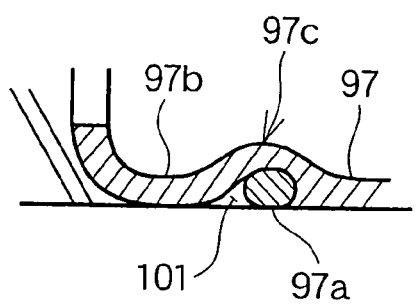
Figure 16H:
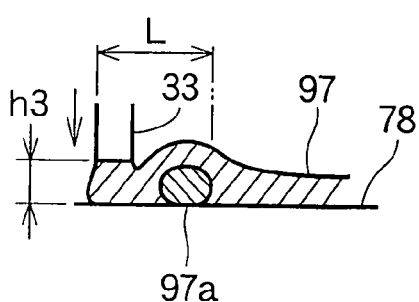

As shown by arrows in FIGS. 16E and 16F, the nozzle 33 continues applying the sealant 97 while horizontally moving, and finishes the application of the sealant 97 as shown in FIG. 16G. At an intersecting portion 97c between the application-start portion 97a and the application-end portion 97b shown in FIG. 16G, a gap 101 is produced on the left of the application-start portion 97a (on the side behind the intersection). No gap is produced on the right of the application-start portion 97a (on the side in front of the intersection), resulting in improved sealing.

In order to fill in the gap 101 on the left of the application-start portion 97a, it is possible to return the nozzle 33 to a position where the sealant-application position is crossed over the application-start portion 97a as shown in FIG. 16, that is, a position horizontally distanced by a predetermined distance L from the location of the vertically moving nozzle 33 shown in FIG. 16D, for example, and then lower the nozzle 33 to the position of a height h3 from the separator 78 (h3<h1 or h3=h2).

Thereafter, the attraction of the separator 78 with the correcting device 47 shown in FIG. 14B is stopped, and the separator 78 applied with the sealant 97 is carried on the pallet 81 (see FIG. 6) to the laminating station.

The laminating station 12 shown in FIG. 1 has a separator mount configured the same as the separator mount 22 shown in FIG. 4. As described in FIGS. 12 and 13A to 13D, the pallet 81 is positioned on the separator mount of the laminating station 12.

Figure 17A:
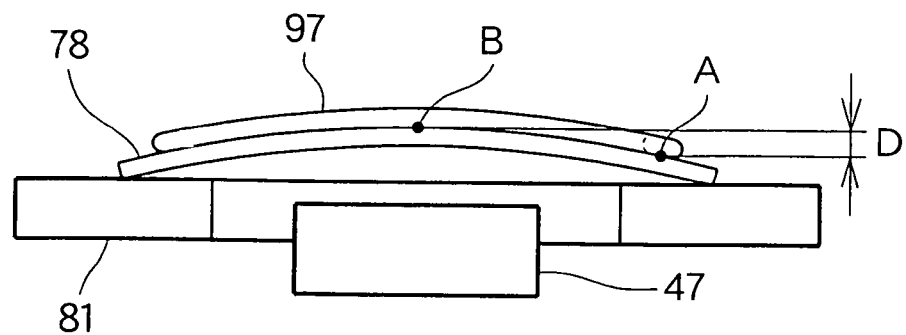
FIGS. 17A to 17C are schematic diagrams illustrating the sequence of superimposing a membrane/electrode assembly on a separator in a laminating station.
Figure 17B:
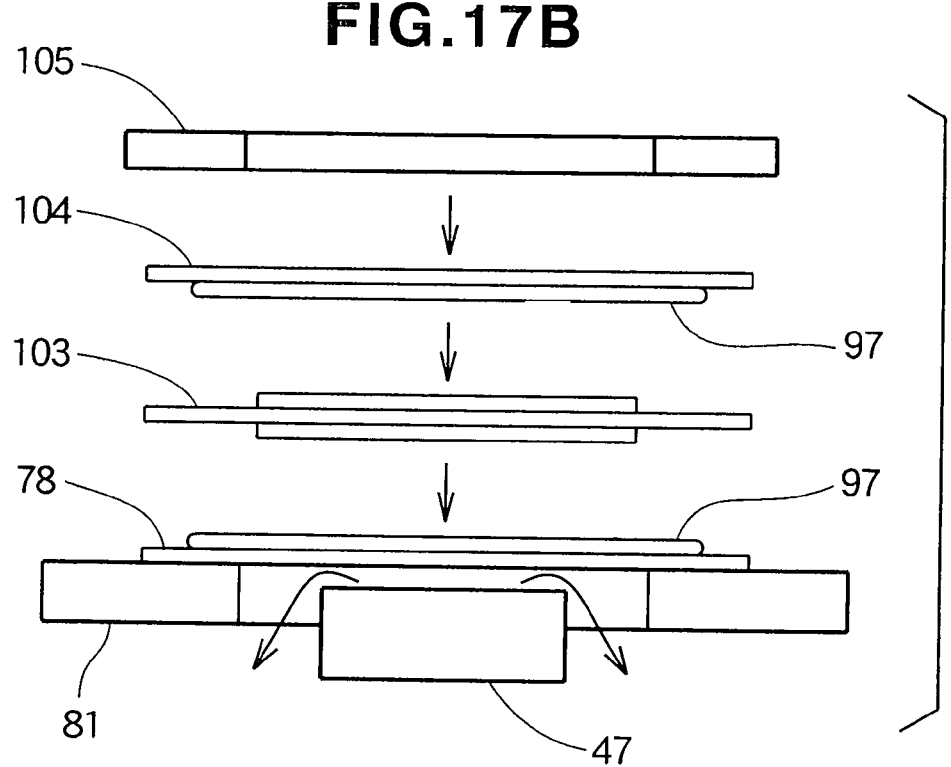
Figure 17C:
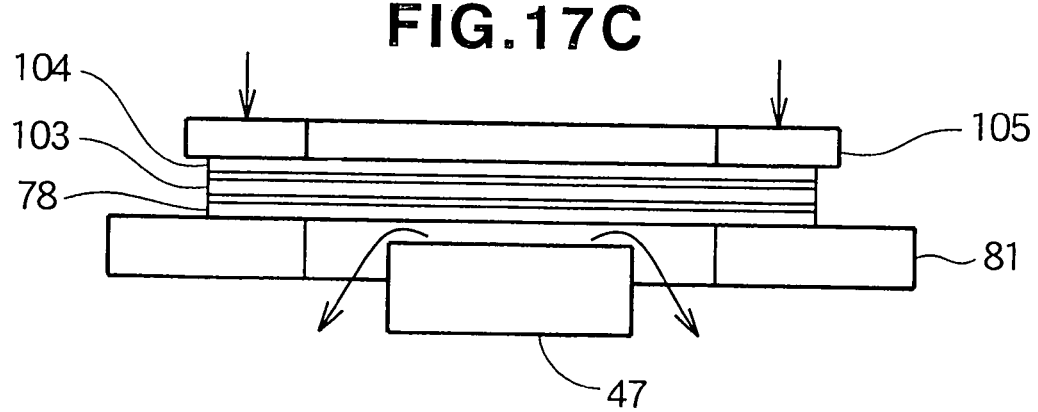
Figure 18A:
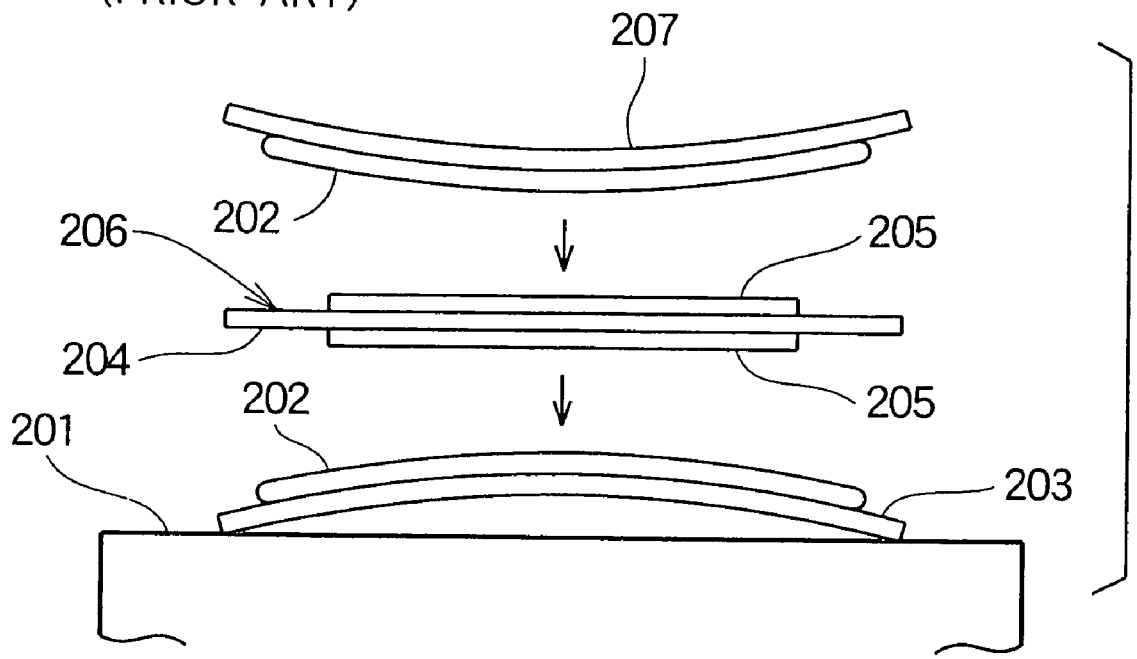
FIGS. 18A and 18B are schematic diagrams illustrating a conventional way of laminating separators and a membrane/electrode assembly.
Figure 18B:
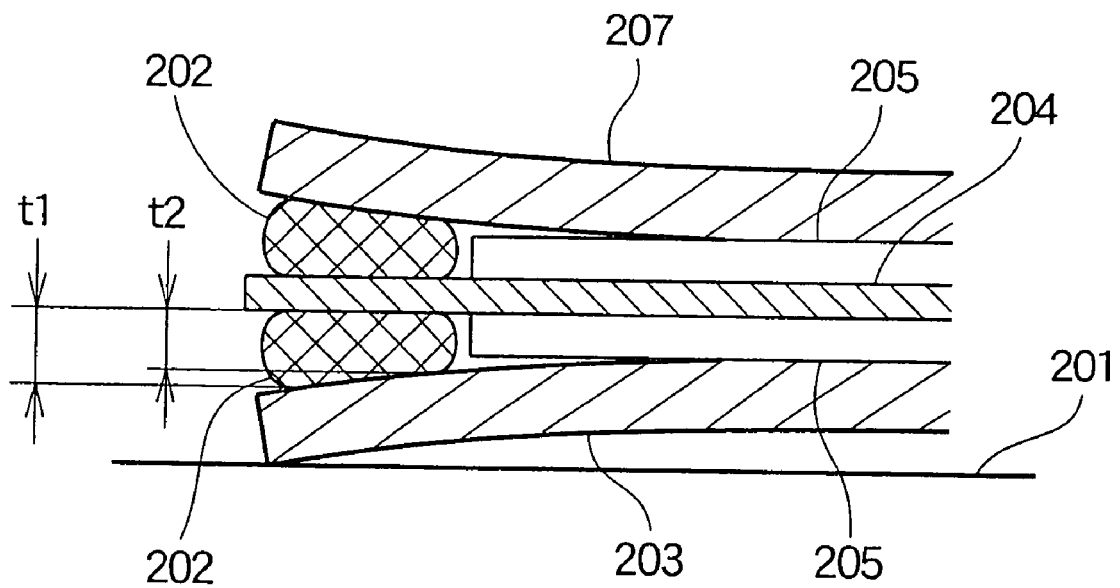

FIGS. 17A to 17C schematically illustrate the sequence of superimposing an MEA on a separator in the laminating station.

FIG. 17A illustrates the pallet 81 placed on the separator mount of the laminating station. The separator 78 applied with the sealant 97 is almost returned to a warped state shown in FIG. 14A. The height between a sealant-applied surface and a corrected surface to be corrected in warping, that is, the distance between a point A on an upper surface of the separator 78 (a point corresponding to the center of the width of the sealant 97) and a point B (the top of the warped separator 78, that is, a corrected position of the separator 78) shown in the figure is D.

In FIG. 17B, a compressed air is supplied to a correcting device 47 provided at the laminating station to jet out from between the corrected device 47 and the separator 78 as shown by arrows, whereby the correcting device 47 attracts the separator 78. The distance D shown in FIG. 17A is reduced to or below a predetermined value. It is desirable to reduce the distance D to zero to flatten the separator 78.

With the separator 78 being attracted for correction, an MEA 103 is placed on a surface of the separator 78 applied with the sealant 97, and another separator 104 already applied with a sealant 97 is placed on the upper surface of the MEA 103, and then a frame member 105 is placed on the separator 104.

In FIG. 17C, the separator 78, MEA 103 and separator 104 superimposed on one another are pressed via the frame member 105 as shown by arrows with a pressing device 107 shown in FIG. 1, producing a cell.

Pressing via the frame member 105 without the correcting device 47, for example, could flatten the separator 78 to some degree. However, the frame member 105 could not press a central portion of the separator 78, preventing the entire flattening of the separator 78.

In the present invention, since the separator 78 is corrected with the correcting device 47 to be sufficiently flat and then pressed with the frame member 105, the sealant 97 is spread out on a flat surface.

As described in FIGS. 17A to 17C, the present invention is characterized in that, in a method of laminating the fuel cell separator 78 and the MEA 103 in which the MEA 103 is superimposed on the separator 78 applied with the sealant 97 in the laminating station 12 (see FIG. 1), the correcting device 47 annexed to the laminating station 12 corrects the warp in the separator 78, and the MEA 103 is superimposed on the separator 78 with the correcting device 47 operated. The sealant 97 applied to the separator 78 can be spread out to an even thickness, providing good sealing.

The correcting device 47 of the present invention is characterized by attracting the separator 78 for flattening under a negative pressure formed by jetting of a compressed air. The separator 78 attracted is thus prevented from contacting the correcting device 47 and will not be damaged.

The present invention is further characterized in that a negative pressure formed at the correcting device 47 is controlled so that the vertical distance D of the separator 78 between the point A on the sealant-applied surface applied with the sealant 97 and the point B on the corrected surface to be corrected in warping is reduced to or below a predetermined value. To reduce the distance D to or below the predetermined value (the distance D is zero at minimum, in which case the separator 78 is flattened), only adjusting the amount of jets of a compressed air can vary the negative pressure, easily setting the distance D. Preparation in the lamination process thus becomes easy, improving workability.

Correcting means of the present invention is not limited to the correcting device 47 shown in the embodiment, and may be a combination of air jetting means and air sucking means.

INDUSTRIAL APPLICABILITY

In the present invention, a correcting device annexed to a laminating station corrects a warp in a separator, and a membrane/electrode assembly is superimposed on the separator with the correcting device being operated, so that a sealant applied to the separator can be spread out to an even thickness, providing good sealing. This is advantageous in the production of fuel cells.

The invention claimed is:

1. A method of laminating a separator and a membrane/electrode assembly for fuel cells, in which said membrane/electrode assembly is superimposed on said separator in a laminating station with a sealant applied to the separator along a peripheral edge thereof, said method comprising the steps of:
   placing said separator on a correcting device, said separator having a warp and said sealant applied thereto along the peripheral edge thereof;
   operating the correcting device so as to correct the warp in said separator; and
   while operating said correcting device to correct the warp in said separator, superimposing said membrane/electrode assembly on said separator,
   wherein said warp correcting step includes:
   attracting and flattening said separator under a negative pressure formed by jetting of a compressed air from said correcting device toward said separator.

2. The laminating method as set forth in claim 1, comprising the further step of controlling said negative pressure formed at said correcting device so as to reduce a height of said separator between a sealant-applied surface applied with said sealant and a corrected surface to be corrected in warping, said height being equal to or less than a predetermined value.

3. An apparatus for laminating a separator and a membrane/electrode assembly for use as a fuel cell, said apparatus comprising:
   a pallet on which said separator applied with a sealant is placed; and
   a correcting device for correcting a warp in said separator while said separator is held by said pallet, said correcting device being operable to correct said warp by attracting and flattening said separator under a negative pressure formed by jetting of a compressed air from said correcting device toward the separator; and
   a pressing device for superimposing said membrane/electrode assembly on said separator; wherein,
   said pressing device is configured to superimpose the membrane/electrode assembly on said separator while said correcting device is being operated to correct said warp in the separator,
   wherein the correcting device comprises:
   a base portion having a plurality of jet orifices defined therethrough, wherein said jet orifices are connected to a compressed air supply such that compressed air is jetted from the jet orifices toward the separator.

* * * * *